United States Patent [19]

LaBate

[11] Patent Number: 4,653,340
[45] Date of Patent: Mar. 31, 1987

[54] BEVELED SPUR GEAR

[75] Inventor: Joseph LaBate, Bethel, Conn.

[73] Assignee: Pitney Bowes Inc., Stamford, Conn.

[21] Appl. No.: 835,592

[22] Filed: Mar. 3, 1986

[51] Int. Cl.$^4$ ............................................. F16H 55/06
[52] U.S. Cl. ......................................... 74/462; 74/437
[58] Field of Search ................. 74/460, 462, 405, 406, 74/421 R, 392, 435, 437, 457

[56] References Cited

U.S. PATENT DOCUMENTS

| | | | |
|---|---|---|---|
| 738,012 | 9/1903 | Dodge | 74/460 |
| 2,204,241 | 6/1940 | Young | 74/435 |
| 2,800,802 | 7/1957 | Rentschler | 74/437 |
| 2,982,084 | 5/1961 | Meyer | 368/99 |
| 3,101,586 | 8/1963 | Polonsky | 74/435 |
| 3,495,468 | 2/1970 | Griffel | 74/462 X |
| 3,817,117 | 6/1974 | Kita et al. | 74/462 |
| 3,881,365 | 5/1975 | Hardy | 74/462 |
| 3,890,853 | 6/1975 | Feitz | 74/435 |
| 4,200,000 | 4/1980 | Fluehmann | 74/437 |

FOREIGN PATENT DOCUMENTS

| | | | |
|---|---|---|---|
| 90752 | 7/1980 | Japan | 74/462 |
| 1574 | of 1853 | United Kingdom | 74/460 |
| 1043390 | 9/1983 | U.S.S.R. | 74/462 |

Primary Examiner—Cornelius J. Husar
Assistant Examiner—Anthony Knight
Attorney, Agent, or Firm—Lawrence E. Sklar; David E. Pitchenick; Melvin J. Scolnick

[57] ABSTRACT

An improvement in a spur gear mechanism having a pair of engageable spur gears, a device for rotating the gears in one direction only, and a device for engaging and disengaging the gears. The improvement includes a chamfer on the top, circumferential surface of each tooth each of the gears. The chamfer starts at the working surface of the gear tooth and extends inwardly toward the juncture of the pitch line of the gear and the non-working surface of the gear tooth, whereby the opposing teeth of the engaging gears do not prevent the re-engagement of the gears when the gears are brought together for engagement.

4 Claims, 4 Drawing Figures

BEVELED SPUR GEAR

BACKGROUND OF THE INVENTION

The instant invention relates to a spur gear mechanism and more particularly to a one directional spur gear arrangement in which the spur gears can be separated from each other.

There are many machines, such as envelope feeding machines, utilizing uni-directional spur gear drives which, when a jam develops in the machine, must be disengaged. In order to re-engage the spur gears it is essential that the teeth of the gears be in line. In a typical envelope feeding machine, the operator of the machine cannot see the gear teeth when it is attempted to re-engage the gears, and in some instances it may happen that the teeth of the opposing spur gears are face to face, in which case reengagement is prevented.

The problem of re-engagement being prevented by opposing teeth of uni-directional spur gears being flat to flat is obviated by the instant invention.

SUMMARY OF THE INVENTION

Accordingly, the instant invention provides an improvement in a spur gear mechanism having a pair of engageable spur gears, means for rotating the gears in one direction only, and means for engaging and disengaging the gears.

The improvement comprises a chamfer on the top, circumferential surface of each tooth in each of the gears. The chamfer starts at the working surface of the gear tooth and extends inwardly toward the juncture of the pitch line of the gear and the non-working surface of the gear tooth, whereby the opposing teeth of the engaging gears do not prevent the re-engagement of the gears when the gears are brought together for engagement.

DETAILED DESCRIPTION OF THE PREFERRED EMBODIMENT

Figure 1:
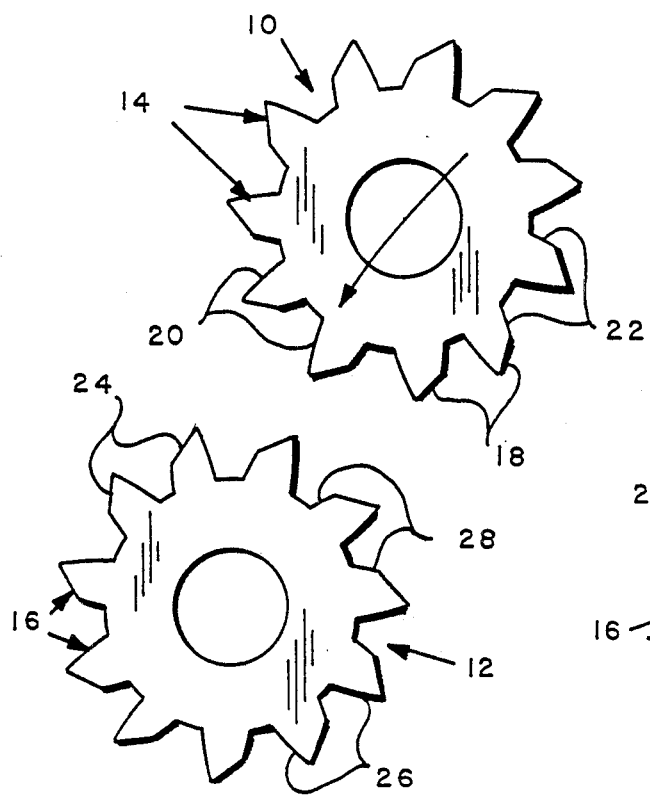
FIG. 1 is a schematic, side elevational view of a pair of engageable, spur gears in accordance with the instant invention separated from each other.

In describing the preferred embodiment of the instant invention, reference is made to the drawings, wherein there is seen an upper spur gear 10 and a lower spur gear 12, which may be used in an envelope feeding machine (not shown) which is well known in the art. The upper spur gear 10 is a driving gear while the lower gear 12 is a driven gear, both of which are appropriately journalled in the housing of the envelope feeding machine. The upper gear 10 includes a plurality of teeth 14 and the lower gear 12 includes a plurality of teeth 16. The envelope feeding machine includes a motor (not shown) for rotating the driving gear 10 clockwise as indicated in FIG. 4.

Each of the teeth 14 on the upper spur gear 10 includes a chamfer 18 on what would otherwise be its top, circumferential surface. The chamfer 18 begins at the working surface 20 of the gear tooth 14 and extends inwardly toward the juncture of the pitch line (not shown) of the gear 10 and the non-working surface 22 of the gear tooth 14. Similarly, each of the teeth 16 on the lower spur gear 12 includes a chamfer 24 on what would otherwise be its top, circumferential surface. The chamfer 24 begins at the working surface 26 of the gear tooth 16 and extends inwardly toward the juncture of the pitch line (not shown) of the gear 12 and the non-working surface 28 of the gear tooth 16.

Figure 4:
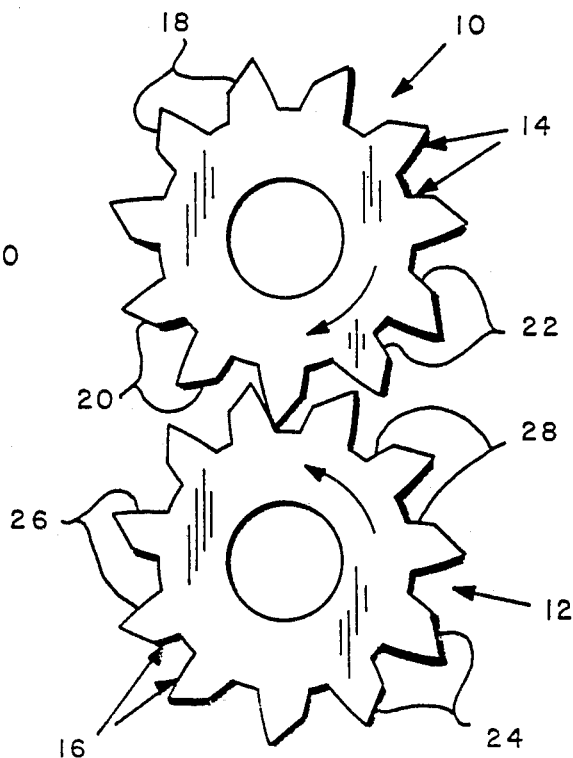
FIG. 4 is similar to FIG. 3 except that the upper gear has completed its engagement with the lower gear.

The gears 10 and 12 are capable of movement in one direction only, as indicated by the arrows in FIG. 4. The gears 10 and 12 are used in an environment, such as an envelope feeding machine, which requires that they be separated from one another on occasions, such as when jams occur in the feeder. FIG. 4 illustrates how the gears 10 and 12 engage each other in their operating position, with the working surfaces 20 of the teeth 14 of the driving gear 10 moving against the working surfaces 26 of the teeth 16 of the driven gear 12. When the gears 10 and 12 need to be separated, as when a jam occurs, they are disengaged from each other and assume the positions illustrated in FIG. 1.

Figure 2:
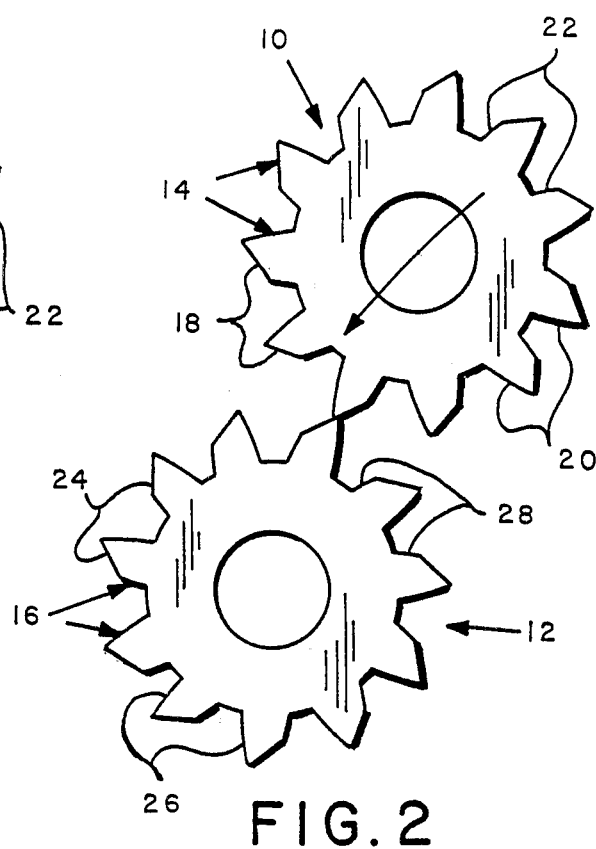
FIG. 2 is similar to FIG. 1 except that the upper gear has approached the lower gear preparatory to engagement.
Figure 3:
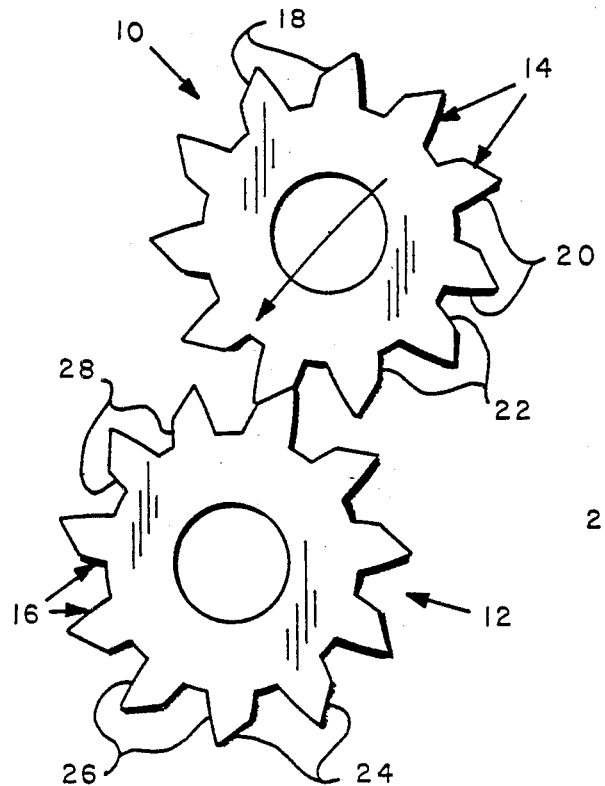
FIG. 3 is similar to FIG. 2 except that a tooth of the upper gear is seen sliding across a tooth of the lower gear.

In this particular instance, the driving gear 10 is seen raised away from the driven gear 12, but it could be arranged for the driven gear 12 to be lowered away from the drive gear 10. Once the jam has been cleared, the gears 10 and 12 can be re-engaged by lowering the drive gear 10 toward the driven gear 12 as seen in FIG. 2. In conventional gears, it would be necessary for the gear teeth 14 and 16 to be in line in order to assure re-engagement. However, with the instant invention, as seen in FIG. 2, it is not necessary for the gear teeth 14 and 16 to be in line in order for the gears 10 and 12 to be re-engaged. Regardless of the alignment of the teeth 14 with respect to the teeth 16, the chamfers 18 and 24 on the back or non-working side of the teeth 14 and 16 respectively allow the teeth 14 to slide (see FIG. 3) across the teeth 16 to facilitate engagement (see FIG. 4) of the gears 10 and 12. Because the chamfers are on the non-working side of the teeth 14 and 16, the ability of the gears 10 and 12 to function is not diminished.

It is thought that the invention and many of its attendant advantages will be understood from the foregoing description and it will be apparent that various changes may be made in the form, construction and arrangement of the parts without departing from the spirit and scope of the invention or sacrificing all of its material advantages, the form hereinbefore described being merely a preferred embodiment thereof.

What is claimed is:

1. In a spur gear mechanism having a pair of engageable spur gears, means for rotating said gears in only one direction, and means for engaging and disengaging said gears, the improvement comprising:
   a chamfer on the top, circumferential surface of each tooth in each of said gears, said chamfer starting at the working surface of said gear tooth and extending inwardly toward the juncture of the pitch line of said gear and the non-working surface of said gear tooth, whereby the opposing teeth of the engaging gears do not prevent re-engagement of the gears when the gears are brought together for engagement.

2. The improvement of claim 1, wherein the spur gears include an upper and a lower gear.

3. The improvement of claim 2, wherein the upper gear is the driving gear, and the lower gear is the driven gear.

4. The improvement of claim 2, wherein said rotating means comprises a motor.

* * * * *